United States Patent [19]

Mayo et al.

[11] Patent Number: 5,593,785
[45] Date of Patent: Jan. 14, 1997

[54] COATING COMPOSITIONS CONTAINING ACRYLIC POLYMERS WITH PENDANT CARBAMATE GROUPS EXHIBITING IMPROVED INTERCOAT ADHESION

[75] Inventors: Michael A. Mayo; Steven V. Barancyk, both of Pittsburgh, Pa.

[73] Assignee: PPG Industries, Inc., Pittsburgh, Pa.

[21] Appl. No.: 494,905

[22] Filed: Jun. 26, 1995

[51] Int. Cl.⁶ .............................. C08L 33/14; C08L 67/02
[52] U.S. Cl. ...................... 428/423.1; 428/482; 428/522; 428/524; 427/385.5; 427/388.3; 525/131; 525/163
[58] Field of Search ........................... 525/163, 131; 427/385.5, 388.3; 428/423.1, 482, 522, 524

[56] References Cited

U.S. PATENT DOCUMENTS

| | | | |
|---|---|---|---|
| 4,543,276 | 9/1985 | Parekh | 525/517 |
| 5,356,669 | 10/1994 | Rehfuss et al. | 427/407.1 |
| 5,373,069 | 12/1994 | Rehfuss et al. | 525/456 |
| 5,412,049 | 5/1995 | Argyropoulos et al. | 526/312 |

FOREIGN PATENT DOCUMENTS

| | | |
|---|---|---|
| 594068 | 4/1994 | European Pat. Off. . |
| 594142 | 4/1994 | European Pat. Off. . |
| 636660 | 2/1995 | European Pat. Off. . |

*Primary Examiner*—Patricia A. Short
*Attorney, Agent, or Firm*—William J. Uhl

[57] ABSTRACT

An adherent film-forming composition comprising a carbamate-functional acrylic polymer, a polyester and an aminoplast crosslinking agent is disclosed. The coating composition can be used to produce clear coats in composite color plus clear coatings exhibiting good levels of acid etch resistance as well as high intercoat adhesion. Also disclosed are a method of applying a composite color plus clear coating to a substrate and the coated article prepared by such a method.

39 Claims, No Drawings

COATING COMPOSITIONS CONTAINING ACRYLIC POLYMERS WITH PENDANT CARBAMATE GROUPS EXHIBITING IMPROVED INTERCOAT ADHESION

CROSS-REFERENCE TO RELATED APPLICATIONS

Reference is made to commonly assigned application Ser. No. 08/447,392, filed May 23, 1995, and application Ser. No. 08/586,053, filed Jan. 16, 1996, which are divisional and continuation-in-part applications, respectively, of application Ser No. 08/236,912, filed Apr. 29, 1994, now abandoned.

FIELD OF THE INVENTION

The present invention relates to film-forming compositions containing acrylic polymers with pendant carbamate groups in combination with crosslinking agents for such polymers, and to the use of such film-forming compositions as clear coats in color plus clear composite coatings.

BACKGROUND OF THE INVENTION

Coating compositions based on acrylic polymers and aminoplast crosslinking agents are particularly desirable as automotive top coats because they have excellent durability, hardness, gloss and appearance. However, such coating compositions, when used as clear coats in color plus clear composite coatings, are particularly susceptible to acid etching. Acid etching is a phenomenon associated with acidic rain water, which is common in many urban and industrial areas. When acidic rain water, also known as acid rain, accumulates on a horizontal section of an automobile such as a hood or trunk deck, it spots and can actually etch away the clear coat leaving a blemish that cannot be polished out. It has been found that acrylic polymers containing pendant or terminal carbamate groups can be cured with aminoplast crosslinking agents to give acid etch resistant clear coats. References that disclose such polymers are U.S. Pat. No. 5,356,669, U.S. Pat. No. 5,336,566, EPO 0,594,142 A1 and EPO 0,590,068 A1.

A problem associated with curable coating compositions based on acrylic polymers containing pendant carbamate groups and aminoplast curing agents is that the compositions do not have particularly good intercoat adhesion. This problem presents itself when the compositions are used as clear coats in composite color plus clear composite coatings, especially during repair procedures which involve applying the clear film-forming composition to a flawed area of a previously applied color plus clear composite coating. The clear coats can actually delaminate from underlying layers of film.

SUMMARY OF THE INVENTION

The adhesion problems associated with film-forming compositions based on acrylic polymers containing pendant carbamate groups and aminoplast curing agents can be alleviated by using fully alkylated aminoplast curing agents and by including in the coating composition certain amounts of a polymer or oligomer containing a plurality of repeating ester groups in the polymer or oligomer backbone. The polymer or oligomer is added in amounts sufficient to increase the intercoat adhesion, but not in amounts that will significantly adversely affect the humidity resistance of the coating. Specifically, the present invention provides an adherent film-forming composition comprising:

(a) 20 to 80 percent by weight of an acrylic polymer containing a plurality of pendant groups of the structure:

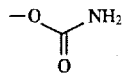

(b) 20 to 80 percent by weight of a polymer or oligomer containing repeating ester groups in the polymer or oligomer backbone; and (c) 25 to 50 percent by weight of a fully alkylated aminoplast crosslinking agent;

the percentages by weight of (a) and (b) being based on total resin solids weight of (a) plus (b); the percentage by weight of (c) being based on total weight of resin solids in the film-forming composition. Preferably, the percentage by weight of (a) plus (b) is from 25 to 75 percent by weight and is based on the total weight of resin solids in the film-forming composition.

Also, the present invention provides a method of applying a composite color plus clear coating to a substrate in which the film-forming composition described above is the clear coat. Further, the present invention provides for coated articles prepared by the above described method.

DETAILED DESCRIPTION

The acrylic polymer component of the film-forming composition can be represented by randomly repeating units according to the following formula:

$$-(CH_2-\underset{\underset{Y-O-\underset{\underset{O}{\|}}{C}-NH_2}{|}}{\overset{\overset{R}{|}}{C}})- \qquad -(Z)- \qquad (I)$$

where R is H or $CH_3$; Z is a repeating unit derived from one or more polymerizable ethylenically unsaturated monomers; and I is present in amounts of 30 to 70 percent by weight, Z is present in amounts of 30 to 70 percent by weight, with the percentage of I plus Z being equal to 100 percent. Y represents a divalent linking group, preferably an aliphatic group of 1 to 8 carbon atoms; or a cycloaliphatic or aromatic linking group of 6 to 10 carbon atoms including substituted groups. Examples of Y include

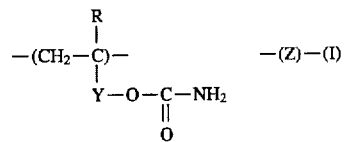

—$(CH_2)$—, —$(CH_2)_2$—, —$(CH_2)_4$—, and the like. In one preferred embodiment, —Y— is represented by —COO—Y'— where Y' is a divalent linking group. Y' can be a divalent aliphatic linking group, preferably of 1 to 8 carbon atoms, e.g., —$(CH_2)$—, —$(CH_2)_2$—, —$(CH_2)_4$—, and the like; or a divalent cycloaliphatic linking group, preferably of up to 8 carbon atoms, e.g., cyclohexyl, and the like. However, other divalent linking groups can be used, depending on the technique used to prepare the polymer. For example, if a hydroxyalkyl carbamate is reacted with an isocyanate-functional acrylic polymer, the linking group Y' would include an —NHCOO-urethane linkage as a residue of the isocyanate group.

Typically, the acrylic polymers are copolymers of one or more alkyl esters of acrylic acid or methacrylic acid, and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate, and 2-ethylhexyl acrylate. Suitable other polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride; vinyl esters such as vinyl acetate; and acid functional monomers such as acrylic and methacrylic acid.

Hydroxyl functional monomers such as hydroxyethyl acrylate, hydroxypropyl acrylate, hydroxyethyl methacrylate, and hydroxypropyl methacrylate can be copolymerized with the acrylic monomers to impart hydroxyl functionality to the acrylic material preferably prepared in accordance with the theoretical hydroxyl values mentioned below.

Pendant carbamate functional groups can be incorporated into the acrylic polymer by copolymerizing the acrylic monomers with a carbamate functional vinyl monomer, for example a carbamate functional alkyl ester of methacrylic acid. These carbamate functional alkyl esters are prepared by reacting, for example, a hydroxyalkyl carbamate, such as the reaction product of ammonia and propylene carbonate, with methacrylic anhydride. Examples of other carbamate functional vinyl monomers are the reaction product of hydroxyethyl methacrylate, isophorone diisocyanate, and hydroxypropyl carbamate; the reaction product of isocyanic acid (HNCO) with a hydroxyl functional acrylic or methacrylic monomer such as hydroxyethyl acrylate, and those described in U.S. Pat. No. 3,479,328. Pendant carbamate groups can also be incorporated into the acrylic polymer by reacting a hydroxyl functional acrylic polymer with a low molecular weight alkyl carbamate such as methyl carbamate. Reference is made to Japanese Kokai 51-4124. Also, hydroxyl functional acrylic polymers can be reacted with isocyanic acid yielding pendant carbamate groups. Note that the production of isocyanic acid is disclosed in U.S. Pat. No. 4,364,913. Likewise, hydroxyl functional acrylic polymers can be reacted with urea to give an acrylic polymer with pendant carbamate groups.

The acrylic polymer can be prepared by solution polymerization techniques in the presence of suitable initiators such as organic peroxides or azo compounds, for example, benzoyl peroxide or N,N-azobis(isobutyronitrile). The polymerization can be carried out in an organic solution in which the monomers are soluble by techniques conventional in the art. Alternatively, the acrylic polymer can be prepared by aqueous emulsion or dispersion polymerization techniques well known in the art.

The acrylic polymer typically has a weight average molecular weight of from about 1000 to 30,000, preferably from about 2000 to 10,000 as determined by gel permeation chromatography using polystyrene as a standard, and an equivalent weight of less than 5000, preferably within the range of 140 to 2500, based on equivalents of reactive pendant carbamate groups. The equivalent weight is a calculated value based on the relative amounts of the various ingredients used in making the acrylic material and is based on the solids of the acrylic polymer.

In addition to the acrylic polymer, the film-forming composition contains a second resinous material comprised of repeating monomer units having a plurality of repeating ester groups in the backbone. This can be a polymeric or oligomeric material, and typically is an oligomeric polyester, a polymeric polyester and/or a polyurethane such as those prepared from polyester polyols and polyisocyanates. The polymers or oligomers having a plurality of ester groups in the backbone are prepared by a condensation or addition reaction in which the ester groups are repeating, i.e.,

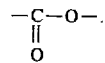

A suitable polyester can be prepared by the esterification of a polycarboxylic acid or an anhydride thereof with a polyol and/or an epoxide. The polycarboxylic acids used to prepare the polyester consist primarily of monomeric polycarboxylic acids or anhydrides thereof having 2 to 18 carbon atoms per molecule. Among the acids that are useful are phthalic acid, hexahydrophthalic acid, adipic acid, sebacic acid, maleic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also, lower alkyl esters of the acids can be used, for example, dimethyl glutarate and dimethyl terephthalate.

Polyols that can be used to prepare the polyester include diols such as alkylene glycols. Specific examples include ethylene glycol, 1,6-hexanediol, neopentyl glycol, and 2,2-dimethyl-3-hydroxypropyl-2,2-dimethyl-3-hydroxypropionate. Other suitable glycols include hydrogenated Bisphenol A, cyclohexanediol, cyclohexanedimethanol, caprolactone-based diols such as the reaction product of e-caprolactone and ethylene glycol, hydroxy-alkylated bisphenols, polyether glycols such as poly(oxytetramethylene)glycol, and the like.

Although the polyol component can comprise all diols, polyols of higher functionality can also be used. It is preferred that the polyol be a mixture of at least one diol; and at least one triol, or one polyol of higher functionality. Examples of polyols of higher functionality would include trimethylol ethane, trimethylol propane, pentaerythritol, and the like. Triols are preferred. The mole ratio of polyols of higher functionality to diol is less than 3.3/1, preferably up to 1.4/1.

In the preferred embodiment, a polyester is prepared from an esterdiol such as 2,2'-dimethyl-3-hydroxypropyl-2,2'-dimethyl-3-hydroxypropionate and a triol such as trimethylolpropane.

The polyester can be can be nonfunctional or, preferably, it can contain functional groups that are reactive with the crosslinking agent described below. Examples of suitable functional groups include hydroxyl groups, carboxylic acid groups, or carbamate groups. Functional groups such as hydroxyl groups and carboxylic acid groups can be incorporated into the polyester by choosing appropriate ratios of polycarboxylic acids, anhydrides, polyols or epoxides for the esterification reaction, as is well known in the art. Nonfunctional polyesters can be prepared from functional polyesters such as hydroxyl functional polyesters by reacting them with a material such as isopropenyl acetate to consume the functional groups, rendering the resulting polyester essentially nonfunctional.

For hydroxyl-containing polyesters, the hydroxyl content will preferably be maintained in accordance with the theoretical hydroxyl values given below. If hydroxyl-functional polyesters are used, they preferably are present in the film-forming composition at levels of 20 to 60, more preferably 20 to 40 percent by weight. With hydroxyl functional polyesters, the acrylic polymer is preferably present in amounts of 40 to 80, more preferably 60 to 80 percent by weight. The percentages are based on the total solids weight of the acrylic polymer and the polyester.

Preferably, the polyester has pendant and/or terminal carbamate groups of the structure:

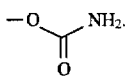

The carbamate groups can be incorporated into the polyester by first forming a hydroxyalkyl carbamate that can be reacted with the polyacids and polyols used in forming the polyester. A polyester oligomer can be prepared by reacting a polycarboxylic acid such as those mentioned above with a hydroxyalkyl carbamate. An example of a hydroxyalkyl carbamate is the reaction product of ammonia and propylene carbonate. The hydroxyalkyl carbamate is condensed with acid functionality on the polyester or polycarboxylic acid, yielding terminal carbamate functionality. Terminal carbamate functional groups can also be incorporated into the polyester by reacting isocyanic acid or a low molecular weight alkyl carbamate such as methyl carbamate with a hydroxy functional polyester. Also, carbamate functionality can be incorporated into the polyester by reacting a hydroxy functional polyester with urea.

If polyesters containing carbamate functional groups are used, they are preferably present in the film-forming composition at levels of 40 to 80 percent, more preferably 40 to 60 percent by weight. With carbamate functional polyesters, the acrylic polymer is preferably present in amounts of 20 to 60, more preferably 40 to 60 percent by weight. The percentages are based on the total solids weight of the acrylic polymer and the polyester.

Besides polyesters, other polymers or oligomers having a plurality of repeating ester groups in the polymer or oligomer backbone such as polyurethanes can be used. Suitable polyurethanes can be formed by reacting a polyisocyanate with a polyester having hydroxyl functionality, and preferably containing pendant and/or terminal carbamate groups. Alternatively, polyurethanes can be prepared by reacting a polyisocyanate with a polyester polyol and a hydroxyalkyl carbamate or isocyanic acid as separate reactants. Examples of suitable polyisocyanates are aromatic and aliphatic polyisocyanates, with aliphatic materials being preferred because they impart better color and durability properties to cured composite films. Examples of suitable aromatic diisocyanates are 4,4'-diphenylmethane diisocyanate, 1,3-phenylene diisocyanate, 1,4-phenylene diisocyanate, and toluene diisocyanate. Examples of suitable aliphatic diisocyanates are straight chain aliphatic diisocyanates such as 1,4-tetramethylene diisocyanate and 1,6-hexamethylene diisocyanate. Cycloaliphatic diisocyanates are preferred because they impart hardness to the product. Examples of suitable cycloaliphatic diisocyanates include 1,4-cyclohexyl diisocyanate, isophorone diisocyanate, α,α'-xylylene diisocyanate and 4,4'-methylene-bis-(cyclohexylisocyanate). The amount of the polyurethane is the same as that for the polyesters mentioned above. Mixtures of polyesters and polyurethanes can be used.

The polyesters and polyurethanes typically have weight average molecular weights of about 1000 to 30,000, preferably 1000 to 10,000 as determined by gel permeation chromatography using polystyrene as a standard. The equivalent weight of the polyesters and polyurethanes containing functional groups, for example, hydroxyl or carbamate groups, will be from about 140 to 2500, based on equivalents of functional groups. The equivalent weight is a calculated value based on the relative amounts of the various ingredients used in making the polyester or polyurethane, and is based on the solids of the material.

The fully alkylated aminoplast crosslinking agent has a plurality of functional groups, for example, alkylated methylol groups, that are reactive with the pendant carbamate groups present in the acrylic polymer and with any functional groups associated with the polyester or polyurethane.

Aminoplast crosslinking agents are obtained from the reaction of formaldehyde with an amine and/or an amide. Melamine, urea, or benzoguanamine condensates are preferred. However, aminoplast condensates prepared from other amines or amides can be used, for example, aldehyde condensates of glycouril, which are useful in formulating powder coatings. Most often, formaldehyde is used as the aldehyde; however, other aldehydes such as acetaldehyde, crotonaldehyde, and benzaldehyde are also suitable.

By the term "fully alkylated" is meant that the alkylol groups associated with the reaction product of an aldehyde with an amine and/or an amide have been etherified to an extent that the alkoxy groups make up at least eighty (80) percent by weight of the functional groups.

The preferred aminoplast crosslinking agent is a melamine-formaldehyde condensate that has been fully alkylated, that is, the melamine-formaldehyde condensate contains methylol groups that have been further etherified with an alcohol, preferably one that contains 1 to 6 carbon atoms. Any monohydric alcohol can be employed for this purpose, including methanol, ethanol, isobutanol, and cyclohexanol. Most preferably, a blend of methanol and n-butanol is used, resulting in a melamine-formaldehyde condensate that is, on average, 75 percent methylated and 25 percent butylated.

Use of aminoplasts which are not fully alkylated results in poor intercoat adhesion.

Preferably, the film-forming composition has a calculated hydroxyl value of less than 50, more preferably less than 25, and most preferably 0, based on the solid weight of the film-forming composition. The calculated hydroxyl value is calculated from the relative amounts of the various ingredients used in making the film-forming composition, rather than from an experimental titration measurement. Hydroxyl values greater than 50 are undesirable because they result in cured films with poor acid etch resistance.

For the acrylic polymer, amounts greater than 80 percent by weight are undesirable because intercoat adhesion properties of cured films suffer; whereas amounts less than 20 percent by weight are undesirable because the humidity resistance of cured films suffers. For the polymer or oligomer with repeating ester groups in the polymer or oligomer backbone, amounts greater than 80 percent by weight are undesirable because the humidity resistance of cured films suffers; whereas amounts less than 20 percent by weight are undesirable because intercoat adhesion properties of cured films suffer. For the crosslinking agent, amounts greater than 50 percent by weight are undesirable because of poor acid etch resistance in the cured film; whereas amounts less than 25 percent by weight are undesirable because of poor cured film properties.

As mentioned above, incorporating the polymer or oligomer containing a plurality of repeating ester groups in the backbone into the film-forming composition improves the intercoat adhesion. This is evident when the film-forming composition is used as the clear coat in a color plus clear composite coating. The improvement in intercoat adhesion is particularly evident during clear-on-clear repair procedures, in which an area of color plus clear composite coating which is flawed is overcoated with another layer of clear (without sanding). Without the polymer or oligomer described above, the topmost layer of clear coat, i.e., the repair coat, can actually delaminate from the underlying color plus clear composite coating. With the polymer or oligomer described above, however, the repair coat becomes part of an adherent composite coating.

Optionally, a diluent can be present in the film-forming composition that serves to reduce the viscosity of the coating composition. If the coating composition is solvent-borne, the diluent typically comprises an organic solvent. Examples of suitable solvents include alcohols such as ethanol, isopropanol, n-butanol, and the like; esters such as n-butyl acetate, n-hexyl acetate, pentyl propionate, and the like; ethers such as the monoethyl, monobutyl and monohexyl ethers of ethylene glycol, and the like; ketones such as methyl ethyl ketone, methyl isobutyl ketone, diisobutyl ketone, and the like; aromatic hydrocarbons such as xylene, or toluene, and the like; aliphatic or alicyclic hydrocarbons such as the various petroleum naphthas and cyclohexane; and mixtures thereof.

The film-forming composition can also be waterborne. For example, the composition can contain an acid functional polymer that can be neutralized with amines and dissolved or dispersed in water. Also, it is possible to prepare an aqueous dispersion of the polymer of the film-forming composition in microparticulate form by imparting high stress using a homogenizer. This latter technique is described in U.S. Pat. No. 5,071,904.

If the coating composition is waterborne, the diluent can optionally contain water-soluble organic cosolvents, for example alcohols with up to about eight carbon atoms such as methanol, ethanol, propanol, butanol, isobutanol, or mixtures thereof; or glycol ethers such as the monoalkyl ethers of ethylene glycol, diethylene glycol, propylene glycol, and the like.

When present, diluents are typically used at a level of up to about 50 percent, preferably up to about 40 percent by weight, based on the total weight of the film-forming composition.

The film-forming composition can also be used in particulate form, i.e., as a powder coating, in which the acrylic polymer and the oligomer or polymer containing the repeating ester groups are chosen such that they have a glass transition temperature (Tg) greater than 60° C. These materials can then be combined with an aldehyde condensate of glycouril, as previously mentioned, to form a powder film-forming composition.

The coating composition is a thermosetting composition and typically contains catalysts to accelerate the curing reactions. Typically, the catalysts are acidic materials. Sulfonic acids, substituted sulfonic acids and amine neutralized sulfonic acids are preferred, for example, p-toluene sulfonic acid, dodecyl benzene sulfonic acid, dinonylnaphthalene disulfonic acid, and the like. The catalyst is usually present in an amount of from 0.50 to 5.0 percent, preferably from 0.5 to 1.0 percent, the percentages based on the total weight of resin solids in the coating composition.

The coating composition can contain other optional ingredients, such as co-reactive resinous materials; plasticizers; anti-oxidants; UV light absorbers; surfactants; flow control agents; anti-settling agents; and the like. When present, these materials are generally used at a level up to 25 percent, preferably up to 10 percent by weight, the percentages based on the total weight of resin solids in the coating composition.

The film-forming composition can be applied to any of the various substrates to which it adheres. Specific examples of suitable substrates include metals, wood, glass, cloth, plastic, foam, elastomeric substrates, and the like. Typically, the substrate is metal or plastic. Optionally, the substrate could have been previously coated with a primer coating composition, or with a pigmented basecoat and the film-forming composition of the present invention applied as a clear coat over the pigmented base coat to form a color plus clear composite coating.

The compositions can be applied by conventional means including brushing, dipping, flow coating, spraying, and the like. Preferably, they are applied by spraying. The usual spray techniques and equipment for air-spraying or electrostatic spraying can be used.

When the film-forming composition is used as a clear coat in a color plus clear composite coating, pigmented base coat is first applied to a substrate at a uniform film thickness of from about 0.25 to about 1.5 mils. The base coat is then "flashed," that is, it is left to stand at temperatures ranging from the ambient temperature to 80° C. for about 10 seconds to 30 minutes, before another coating composition is applied to it. Then, typically, the clear coating composition of the present invention is applied over the coated substrate in one or more coats to a uniform film thickness from 0.5 to 5.0 mils. The substrate is then flashed again and finally baked until the film is cured, typically for about 20 minutes to about 40 minutes at from about 100° C. to about 200° C. to produce the coated article.

The base coating compositions are those well known in the art as described, for example, in U.S. Pat. No. 4,681,811, column 1, line 56 to column 4, line 2.

Illustrating the invention are the following examples that are not to be considered as limiting the invention to their details. All parts and percentages in the examples as well as throughout the specification are by weight unless otherwise indicated.

EXAMPLE A

A carbamate functional acrylic polymer was prepared from the following ingredients:

| Ingredients | Weight in parts |
| --- | --- |
| EXXATE 600[1] | 154.3 |
| LUPERSOL 555M60[2] | 21.1 |
| EXXATE 600 | 21.1 |
| butyl methacrylate | 122.6 |
| hydroxypropyl acrylate | 84.6 |
| methyl styrene dimer | 4.2 |
| EXXATE 600 | 6.5 |
| di-t-amyl peroxide | 2.1 |
| EXXATE 600 | 10.3 |
| EXXATE 600 | 2.5 |
| triphenylphosphite | 0.4 |
| EXXATE 600 | 2.5 |
| DOWANOL PM[3] | 2.5 |
| butyl stannoic acid | 0.5 |
| triphenylphosphite | 0.3 |
| DOWANOL PM | 2.0 |
| DOWANOL PM carbamate[4] (37% solution in DOWANOL PM) | 219.1 |
| DOWANOL PM | 3.0 |
| ethyl 3-ethoxypropionate | 42.0 |
| DOWANOL PM | 42.0 |

[1]Oxohexylacetate available from Exxon Co.
[2]t-amyl peroxyacetate available from Atochem North America, Inc.
[3]1-methoxy-2-propanol available from Dow Chemical Co.
[4]Reaction product of DOWANOL PM and urea.

The first ingredient was charged to a suitable reactor under an $N_2$ blanket and heated to 155° C. The next two ingredients were mixed together and added to the reactor at a constant rate over 3.5 hours. Addition of a mixture of hydroxypropyl acrylate, butyl methacrylate, methyl styrene dimer, and EXXATE 600 was begun 15 minutes after the beginning of the first addition and added at a constant rate over 3 hours. A rinse of EXXATE 600 followed both additions. The reaction was held at temperature for 1 hour. A mixture of di-t-amyl peroxide and EXXATE 600 was then added to the reactor over a period of 0.5 hour, followed by a EXXATE 600 rinse. The reaction was held for an additional 3 hours. The reaction was then cooled to 140° C. While the reaction was cooling, triphenylphosphite was added to the reactor, followed by an EXXATE 600 rinse. Solvent was then distilled from the reactor under reduced pressure. DOWANOL PM and butyl stannoic acid were added to the reactor as a slurry, followed by triphenylphosphite and a DOWANOL PM rinse. The DOWANOL PM carbamate was added to the reactor over a period of 3 hours. During the addition, DOWANOL PM was distilled from the reactor under reduced pressure. Upon completion of the addition a DOWANOL PM rinse was added to the reactor. The reaction was continued until DOWANOL PM evolution stopped. The resin prior to dilution had a residual hydroxyl value of 26.5. The resin was diluted with a 1:1 mixture of ethyl 3-ethoxypropionate and DOWANOL PM. After dilution, the resin had a measured solids content of 66.5% and a Gardner-Holt viscosity of U−. The carbamate functional acrylic polymer had a number average molecular weight (Mn) of 1176 and a weight average molecular weight (Mw) of 2721 as determined by gel permeation chromatography using a polystyrene standard.

EXAMPLE B

A carbamate functional polyester polymer was prepared from the following ingredients:

| Ingredients | Weight in parts |
| --- | --- |
| 2,2-dimethyl-3-hydroxypropyl-2,2-dimethyl-3-hydroxypropyl propionate | 196.8 |
| deionized $H_2O$ | 10.0 |
| trimethylolpropane | 42.9 |
| butyl stannoic acid | 0.6 |
| triphenylphosphite | 0.8 |
| deionized $H_2O$ | 3.0 |
| methylhexahydrophthalic anhydride | 158.3 |
| deionized $H_2O$ | 10.0 |
| DOWANOL PM | 3.0 |
| butyl stannoic acid | 0.5 |
| triphenylphosphite | 0.5 |
| DOWANOL PM | 2.0 |
| DOWANOL PM carbamate (37% solution in DOWANOL PM) | 318.9 |
| DOWANOL PM | 10.0 |
| DOWANOL PM | 105.0 |

The first ingredient was charged to a suitable reactor equipped with a glycol recovery column. Deionized $H_2O$ was added to the reactor as a rinse for the first ingredient. Trimethylolpropane, butyl stannoic acid, and triphenylphosphite were then added to the reactor, followed by a deionized $H_2O$ rinse. Methylhexa-hydrophthalic anhydride, with a subsequent deionized $H_2O$ rinse, was then added to the reactor. The reaction mixture was then heated to 77° C. and sparged with nitrogen for 20 minutes. The reaction mixture was heated to 210° C. and $H_2O$ was removed from the reactor with the nitrogen sparge. The reaction was held to an acid value of 10.2 and the batch cooled to 140° C. The intermediate resin had a hydroxyl value of 156.6. DOWANOL PM and butyl stannoic acid were added to the reactor as a slurry, followed by addition of triphenylphosphite and a DOWANOL PM rinse. DOWANOL PM carbamate in DOWANOL PM solution was added to the reactor over a period of 4 hours. During the addition, DOWANOL PM was distilled from the reactor under reduced pressure. Upon completion of the addition a DOWANOL PM rinse was added to the reactor. The reaction was continued until DOWANOL PM evolution stopped. A sample of resin (90 parts) was removed from the reactor; the remaining resin was diluted with DOWANOL PM. The resin prior to dilution had a residual hydroxyl value of 19.4 and an acid value of 8.5. After dilution, the resin had a measured solids content of 71.2% and a Gardner-Holt viscosity of Z1+. The carbamate functional polyester polymer had an Mn of 720 and an Mw of 2220 as determined by gel permeation chromatography using a polystyrene standard.

EXAMPLE C

A solution of a hydroxyl functional polyester was prepared from the following ingredients:

| Ingredient | Weight in grams |
| --- | --- |
| polyester[1] | 600.0 |
| DOWANOL PM | 150.0 |

[1] Reaction product of trimethylolpropane, 2,2-dimethyl-3-hydroxypropyl-2,2-dimethyl-3-hydroxypropionate, and methylhexahydrophthalic anhydride in a 1:3.01:2.95 mole ratio with an Mn of 1254 and an Mw of 2794.

The first ingredient was heated in a oven until sufficiently fluid and combined with the second ingredient with stirring. The diluted resin had a measured solids content of 77.9% and a Gardner-Holt viscosity of Z1+.

EXAMPLE D

A hydroxyl terminated ester oligomer was prepared from the following ingredients:

| Ingredient | Weight in grams |
| --- | --- |
| trimethylolpropane | 120.60 |
| triphenylphosphite | 2.33 |
| butyl acetate | 120.60 |
| methylhexahydrophthalic anhydride | 444.53 |
| CARDURA E[1] | 661.50 |
| DOWANOL PM | 186.57 |

[1] Glycidyl ester of branched $C_{10}$ saturated carboxylic acid available from Shell Chemical Co.

The first three ingredients were charged to a suitable reactor and heated to 115° C. under a nitrogen blanket. Methylhexahydrophthalic anhydride was added to the reactor dropwise over a period of 2 hours and the reaction held at temperature until the anhydride was consumed as determined by IR spectroscopy. The reaction temperature was raised to 120° C. and CARDURA E was added to the reactor dropwise over a period of 4 hours. The reaction was held at temperature to a acid value of 12.4 and an epoxy equivalent weight of 22,500. After dilution with DOWANOL PM, the final product had a measured solids content of 84.6% and a viscosity of Z4− on the Gardner-Holt viscosity scale. The hydroxyl terminated ester oligomer had an Mn of 1047 and an Mw of 1274 as determined by gel permeation chromatography using a polystyrene standard.

EXAMPLE E

A partially defunctionalized polyester was prepared from the following ingredients:

| Ingredient | Weight in grams |
| --- | --- |
| polyester used in Example C | 381.3 |
| dibutyltin oxide | 0.5 |
| isopropenyl acetate | 130.0 |
| DOWANOL PM | 141.1 |

The first two ingredients were charged to a suitable reactor equipped for fractional distillation and heated to 130° C. Isopropenyl acetate was added dropwise to the polyester over a period of 4 hours. Acetone was removed from the reactor by distillation. The material before dilution had a measured OH value of 47.5. After dilution with DOWANOL PM, the reaction mixture had a final solids content of 75.4% and a viscosity of U− on the Gardner-Holt scale. The partially defunctionalized polyester had an Mn of 1258 and an Mw of 2987 as determined by gel permeation chromatography using a polystyrene standard.

EXAMPLE F

A hydroxyl terminated linear polyester was prepared from the following ingredients:

| Ingredient | Weight in grams |
| --- | --- |
| methylhexahydrophthalic anhydride | 630.0 |
| 2,2-dimethyl-3-hydroxypropyl-2,2-dimethyl-3-hydroxypropyl propionate | 1162.8 |
| butyl stannoic acid | 1.8 |
| triphenylphosphite | 1.8 |
| DOWANOL PM | 432.23 |

The first four ingredients were charged to a suitable reactor equipped with a nitrogen sparge and a glycol recovery column and heated to 210° C. As water was removed from the reaction, the acid value of the reaction mixture dropped to 9.4. The reaction mixture was cooled and diluted with DOWANOL PM. After dilution, the reaction mixture had a measured solids content of 79.0% and a viscosity of W− on the Gardner-Holt scale. The hydroxyl terminated linear polyester had an Mn of 939 and an Mw of 1626 as determined by gel permeation chromatography using a polystyrene standard.

EXAMPLE G

An acid functional polyester was prepared from the following ingredients:

| Ingredient | Weight in grams |
| --- | --- |
| polyester used in Example C | 424.65 |
| butyl acetate | 64.60 |
| methylhexahydrophthalic anhydride | 156.41 |
| DOWANOL PM | 129.09 |

The first two ingredients were charged to a suitable reactor and heated to 115° C. under a nitrogen blanket. Methylhexahydrophthalic anhydride was added dropwise to the reactor over a period of 2 hours, then held for an additional 4 hours until the anhydride was consumed as determined by IR spectroscopy. The material before dilution had a measured residual hydroxyl value of 8.4. After dilution with DOWANOL PM, the reaction mixture had a final solids content of 74.8%, a viscosity of U on the Gardner-Holt scale and an acid value of 65.2. The acid functional polyester had an Mn of 1572 and an Mw of 3103 as determined by gel permeation chromatography using a polystyrene standard.

EXAMPLE H

A carbamate functional polyester was prepared from the following ingredients:

| Ingredients | Weight in grams |
| --- | --- |
| trimethylolpropane | 2680.0 |
| methylhexahydrophthalic anhydride | 3964.8 |
| 2,2-dimethyl-3-hydroxypropyl-2,2-dimethyl-3-hydroxypropyl propionate | 1224.0 |
| butyl stannoic acid | 11.80 |
| triphenylphosphite | 7.88 |
| butyl stannoic acid | 10.06 |
| triphenylphosphite | 10.06 |
| DOWANOL PM carbamate (37% solution in DOWANOL PM) | 8472.4 |
| n-propanol | 2826.2 |

The first five ingredients were charged to a suitable reactor equipped with a nitrogen sparge and a glycol recovery column and heated to 210° C. As water was removed from the reaction, the acid value of the reaction mixture dropped to 10. The intermediate resin was then cooled to 140° C. Butyl stannoic acid and triphenylphosphite were added to the reactor. The DOWANOL PM carbamate was added to the reactor over a period of 4 hours. During the addition, DOWANOL PM was distilled from the reactor under reduced pressure. The reaction was continued until DOWANOL PM evolution stopped. Prior to dilution, the material had a residual OH value of 71.9. The resin was diluted with n-propanol. After dilution, the resin had a measured solids content of 78.5% and a Gardner-Holt viscosity of Z10. The carbamate functional polyester had an Mn of 2159 and an Mw of 29,535 as determined by gel permeation chromatography using a polystyrene standard.

EXAMPLE I

A carbamate functional polyester was prepared from the following ingredients:

| Ingredients | Weight in grams |
| --- | --- |
| trimethylolpropane | 162.4 |
| methylhexahydrophthalic anhydride | 732.5 |
| 2,2-dimethyl-3-hydroxypropyl-2,2-dimethyl-3-hydroxypropyl propionate | 743.7 |
| butyl stannoic acid | 2.4 |
| triphenylphosphite | 1.6 |
| butyl stannoic acid | 2.0 |
| triphenylphosphite | 2.0 |
| DOWANOL PM carbamate (37% solution in DOWANOL PM) | 933.4 |
| DOWANOL PM | 710.0 |

The first five ingredients were charged to a suitable reactor equipped with a nitrogen sparge and a glycol recovery column and heated to 210° C. As water was removed from the reaction, the acid value of the reaction mixture dropped to 10.1. The intermediate resin was then cooled to 140° C. Butyl stannoic acid and triphenylphosphite were added to the reactor. DOWANOL PM carbamate in DOWANOL PM solution was added to the reactor over a period of 4 hours. During the addition, DOWANOL PM was distilled from the reactor under reduced pressure. The reaction was continued until DOWANOL PM evolution stopped. Before dilution, the material had a residual OH value of 26.0. The resin was diluted with DOWANOL PM. After dilution, the resin had a measured solids content of 73.6% and a Gardner-Holt viscosity of Z1+. The carbamate functional polyester had an Mn of 1511 and an Mw of 8833 as determined by gel permeation chromatography using a polystyrene standard.

EXAMPLE J

A OH terminal polyester urethane resin was prepared from the following ingredients:

| Ingredient | Weight in grams |
| --- | --- |
| polyester[1] | 312.8 |
| DOWANOL PM acetate | 46.96 |
| dibutyltin dilaurate | 0.16 |
| DESMODUR W[2] | 31.28 |

[1]Reaction product of neopentyl glycol, hexahydrophthalic anhydride, adipic acid, and DESMODUR W in a 1.00:0.50:0.22:0.001 mole ratio.
[2]4,4'-methylenebis(cyclohexylisocyanate) available from Bayer Inc.

The first three ingredients were charged to a reactor, placed under a nitrogen blanket, and heated to 80° C. DESMODUR W was added to the reactor dropwise over a period of 3 hours and the reaction held until all the isocyanate was consumed as determined by IR spectroscopy. The resulting resin had a hydroxyl value of 80.6, a measured solids content of 82.2% and a Gardner-Holt viscosity of Z2. The hydroxyl terminal polyester urethane had an Mn of 1201 and an Mw of 1880 as determined by gel permeation chromatography using a polystyrene standard.

The following examples (1–21) show the preparation of various clear film-forming compositions prepared with aminoplast curing agents, carbamate functional acrylic, and polyester materials. The coating compositions were evaluated in color-plus-clear applications.

EXAMPLES 1

A clear film-forming composition was prepared by mixing together the following ingredients:

| Ingredient | Solid weight in grams | Solution weight in grams |
| --- | --- | --- |
| n-amyl propionate | — | 26.8 |
| methyl n-amyl ketone | — | 15.9 |
| TINUVIN 328[1] | 3.0 | 3.0 |
| TINUVIN 292[2] | 0.4 | 0.4 |
| polybutylacrylate[3] | 0.4 | 0.7 |
| DDBSA[4] | 1.0 | 1.4 |
| CYMEL 1130[5] | 35.0 | 35.0 |
| carbamate containing acrylic of Example A | 65.0 | 97.7 |

[1]Substituted benzotriazole UV light stabilizer available from Ciba Geigy Corporation.
[2]Sterically hindered tertiary amine light stabilizer available from Ciba Geigy Corporation.
[3]A flow control agent having a Mw of about 6700 and Mn of about 2600 made in xylene at 62.5% solids.
[4]Dodecyl benzene sulfonic acid solution.
[5]A fully alkylated, mixed methoxy/butoxy functional aminoplast resin available from Cytec Industries.

EXAMPLE 2

A clear film-forming composition was prepared by mixing together the following ingredients:

| Ingredient | Solid weight in grams | Solution weight in grams |
| --- | --- | --- |
| n-amyl propionate | — | 28.1 |
| methyl n-amyl ketone | — | 17.6 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 52.0 (80%) | 78.1 |
| carbamate containing polyester of Example B | 13.0 (20%) | 18.3 |

EXAMPLE 3

A clear film-forming composition was prepared by mixing together the following ingredients:

| Ingredient | Solid weight in grams | Solution weight in grams |
| --- | --- | --- |
| n-amyl propionate | — | 29.3 |
| methyl n-amyl ketone | — | 17.6 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 39.0 (60%) | 58.6 |
| carbamate containing polyester of Example B | 26.0 (40%) | 36.6 |

EXAMPLE 4

A clear film-forming composition was prepared by mixing together the following ingredients:

| Ingredient | Solid weight in grams | Solution weight in grams |
| --- | --- | --- |
| n-amyl propionate | — | 30.6 |
| methyl n-amyl ketone | — | 17.6 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 26.0 (40%) | 39.0 |
| carbamate containing polyester of Example B | 39.0 (60%) | 54.9 |

EXAMPLE 5

A clear film-forming composition was prepared by mixing together the following ingredients:

| Ingredient | Solid weight in grams | Solution weight in grams |
| --- | --- | --- |
| n-amyl propionate | — | 31.8 |
| methyl n-amyl ketone | — | 17.6 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 13.0 (20%) | 19.5 |
| carbamate containing polyester of Example B | 52.0 (80%) | 73.2 |

EXAMPLE 6

A clear film-forming composition was prepared by mixing together the following ingredients:

| Ingredient | Solid weight in grams | Solution weight in grams |
|---|---|---|
| n-amyl propionate | — | 33.0 |
| methyl n-amyl ketone | — | 17.6 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing polyester of Example B | 65.0 | 91.5 |

EXAMPLE 7

A clear film-forming composition was prepared by mixing together the following ingredients:

| Ingredient | Solid weight in grams | Solution weight in grams |
|---|---|---|
| n-amyl propionate | — | 30.1 |
| methyl n-amyl ketone | — | 11.8 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 52.0 (80%) | 78.1 |
| hydroxyl containing polyester of Example C | 13.0 (20%) | 16.3 |

EXAMPLE 8

A clear film-forming composition was prepared by mixing together the following ingredients:

| Ingredient | Solid weight in grams | Solution weight in grams |
|---|---|---|
| n-amyl propionate | — | 28.4 |
| methyl n-amyl ketone | — | 13.6 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 39.0 (60%) | 58.6 |
| hydroxyl containing polyester of Example C | 26.0 (40%) | 32.5 |

EXAMPLE 9

A clear film-forming composition was prepared by mixing together the following ingredients:

| Ingredient | Solid weight in grams | Solution weight in grams |
|---|---|---|
| n-amyl propionate | — | 31.7 |
| methyl n-amyl ketone | — | 10.0 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 26.0 (40%) | 39.0 |
| hydroxyl containing polyester of Example C | 39.0 (60%) | 48.8 |

EXAMPLE 10

A clear film-forming composition was prepared by mixing together the following ingredients:

| Ingredient | Solid weight in grams | Solution weight in grams |
|---|---|---|
| n-amyl propionate | — | 30.0 |
| methyl n-amyl ketone | — | 10.0 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 13.0 (20%) | 19.5 |
| hydroxyl containing polyester of Example C | 52.0 (80%) | 65.0 |

EXAMPLE 11

A clear film-forming composition was prepared by mixing together the following ingredients:

| Ingredient | Solid weight in grams | Solution weight in grams |
|---|---|---|
| n-amyl propionate | — | 33.2 |
| methyl n-amyl ketone | — | 11.1 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| hydroxyl containing polyester of Example C | 65.0 | 81.3 |

EXAMPLE 12

A clear film-forming composition was prepared by mixing together the following ingredients:

| Ingredient | Solid weight in grams | Solution weight in grams |
|---|---|---|
| n-amyl propionate | — | 32.2 |
| methyl n-amyl ketone | — | 10.0 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 32.5 (50%) | 48.9 |
| hydroxyl containing oligomer of Example D | 32.5 (50%) | 38.4 |

EXAMPLE 13

A clear film-forming composition was prepared by mixing together the following ingredients:

| Ingredient | Solid weight in grams | Solution weight in grams |
|---|---|---|
| n-amyl propionate | — | 22.5 |
| methyl n-amyl ketone | — | 14.0 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 32.5 (50%) | 48.9 |
| polyester of Example E | 32.5 (50%) | 43.1 |

EXAMPLE 14

A clear film-forming composition was prepared by mixing together the following ingredients:

| Ingredient | Solid weight in grams | Solution weight in grams |
|---|---|---|
| n-amyl propionate | — | 24.5 |
| methyl n-amyl ketone | — | 14.0 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 32.5 (50%) | 48.9 |
| hydroxyl containing polyester of Example F | 32.5 (50%) | 41.1 |

EXAMPLE 15

A clear film-forming composition was prepared by mixing together the following ingredients:

| Ingredient | Solid weight in grams | Solution weight in grams |
|---|---|---|
| n-amyl propionate | — | 27.2 |
| methyl n-amyl ketone | — | 12.0 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 32.5 (50%) | 48.9 |
| acid containing polyester of Example G | 32.5 (50%) | 43.4 |

EXAMPLE 16

A clear film-forming composition was prepared by mixing together the following ingredients:

| Ingredient | Solid weight in grams | Solution weight in grams |
|---|---|---|
| n-amyl propionate | — | 39.2 |
| methyl n-amyl ketone | — | 27.5 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 32.5 (50%) | 48.9 |
| carbamate containing polyester of Example H | 32.5 (50%) | 41.4 |

EXAMPLE 17

A clear film-forming composition was prepared by mixing together the following ingredients:

| Ingredient | Solid weight in grams | Solution weight in grams |
|---|---|---|
| n-amyl propionate | — | 31.4 |
| methyl n-amyl ketone | — | 18.0 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 32.5 (50%) | 48.9 |
| carbamate containing polyester of Example I | 32.5 (50%) | 44.2 |

EXAMPLE 18

A clear film-forming composition was prepared by mixing together the following ingredients:

| Ingredient | Solid weight in grams | Solution weight in grams |
|---|---|---|
| n-amyl propionate | — | 34.7 |
| methyl n-amyl ketone | — | 15.0 |
| TINUVIN 328 | 3.0 | 3.0 |
| TINUVIN 292 | 0.4 | 0.4 |
| polybutylacrylate | 0.4 | 0.7 |
| phenyl acid phosphate (PAP) | 1.0 | 1.2 |
| CYMEL 327[1] | 35.0 | 38.9 |
| carbamate containing acrylic of Example A | 39.0 (60%) | 58.6 |
| hydroxyl containing polyester of Example C | 26.0 (40%) | 32.5 |

[1] A partially alkylated aminoplast resin available from Cytec Industries which contains approximately 68% methoxy, 22% imino, and 10% methylol functionality by weight.

EXAMPLE 19

A clear film-forming composition was prepared by mixing together the following ingredients:

| Ingredient | Solid weight in grams | Solution weight in grams |
|---|---|---|
| n-amyl propionate | — | 29.8 |
| methyl n-amyl ketone | — | 15.0 |
| TINUVIN 328 | 3.0 | 3.0 |
| TINUVIN 292 | 0.4 | 0.4 |
| polybutylacrylate | 0.4 | 0.7 |
| PAP | 1.0 | 1.2 |
| CYMEL 380[1] | 35.0 | 43.8 |
| carbamate containing | 39.0 (60%) | 58.6 |

-continued

| Ingredient | Solid weight in grams | Solution weight in grams |
|---|---|---|
| acrylic of Example A | | |
| hydroxyl containing polyester of Example C | 26.0 (40%) | 32.5 |

[1] A partially alkylated aminoplast resin available from Cytec Industries which contains approximately 66% methoxy, 3% imino, and 31% methylol functionality by weight.

EXAMPLE 20

A clear film-forming composition was prepared by mixing together the following ingredients:

| Ingredient | Solid weight in grams | Solution weight in grams |
|---|---|---|
| n-amyl propionate | — | 33.8 |
| methyl n-amyl ketone | — | 15.0 |
| TINUVIN 328 | 3.0 | 3.0 |
| TINUVIN 292 | 0.4 | 0.4 |
| polybutylacrylate | 0.4 | 0.7 |
| PAP | 1.0 | 1.2 |
| RESIMENE 741[1] | 35.0 | 39.8 |
| carbamate containing acrylic of Example A | 39.0 (60%) | 58.6 |
| hydroxyl containing polyester of Example C | 26.0 (40%) | 32.5 |

[1] A partially alkylated aminoplast resin available from Monsanto Chemical Co. which contains approximately 62% methoxy, 13% imino, and 25% methylol functionality by weight.

EXAMPLE 21

A clear film-forming composition was prepared by mixing together the following ingredients:

| Ingredient | Solid weight in grams | Solution weight in grams |
|---|---|---|
| n-amyl propionate | — | 31.1 |
| methyl n-amyl ketone | — | 10.0 |
| TINUVIN 328 | 3.0 | 3.0 |
| TINUVIN 292 | 0.4 | 0.4 |
| polybutylacrylate | 0.4 | 0.7 |
| DDBSA | 1.0 | 1.4 |
| CYMEL 1130 | 35.0 | 35.0 |
| carbamate containing acrylic of Example A | 32.5 (50%) | 48.9 |
| hydroxyl containing poly(ester urethane) of Example J | 32.5 (50%) | 39.5 |

The film-forming compositions of Examples 1–21 were applied to pigmented basecoats to form color-plus-clear composite coatings over electrocoated steel substrates. The basecoats used for examples 1–21 are commercially available from PPG Industries, Inc. and are identified as DCT-6373 (black in color) and DCT-6720 (silver metallic). The electrocoat used on the steel is commercially available from PPG Industries, Inc. and is identified as ED-5000.

The basecoat was spray applied in two coats to electrocoated steel panels at a temperature of about 75° F. (24° C.). A ninety second flash time was allowed between the two basecoat applications. After the second basecoat application, a flash time of 5 to 10 minutes was allowed at 75° F. (24° C.) before the application of the clear coating composition. The clear coating compositions of Examples 1–21 were each applied to a basecoated panel in two coats with a ninety second flash at 75° F. (24° C.) allowed between coats. The composite coating was allowed to air flash at 75° F. (24° C.) for 10 to 15 minutes before baking at 285° F. (141° C.) to cure both the basecoat and the clearcoat. The panels were baked in a horizontal position. One black and one silver colored panel for each clearcoat example was baked for 25 minutes and used to test appearance, acid etch resistance, and humidity resistance. In order to test recoat adhesion of the clearcoat examples, a second black colored panel for each clearcoat example was prepared using the identical application procedure described above, however these panels were baked for one hour at 285° F. (141° C.), to cure both the basecoat and the clearcoat, at which point each panel was allowed to cool, and then the same clearcoat example was reapplied directly to the surface of the first fully-cured clearcoat without sanding or applying an additional layer of basecoat. The panels were then baked for 25 minutes at 285° F. (141° C.) to cure the additional layer of clearcoat. The purpose of the longer bake time on the first coat of basecoat and clearcoat was to increase the severity of adhesion failure between the two separately cured layers of clearcoat. The results for acid etch resistance and recoat adhesion over black basecoat, and appearance and humidity resistance over silver basecoat are shown in Table 1.

TABLE 1

| Clearcoat Example # | Weight Ratio Acrylic/Polyester | | Acid Etch[1] | 20° gloss/DOI[2] | Humidity Resistance[3] Blush/Blisters | Recoat Adhesion[4] |
|---|---|---|---|---|---|---|
| 1 | 100/0 | — | 2 | 94/82 | 0/none | 0 |
| 2 | 80/20 | carbamate functional polyester | 4 | 95/83 | 0/none | 0 |
| 3 | 60/40 | " | 4–5 | 94/78 | 1/none | 2 |
| 4 | 40/60 | " | 3 | 94/81 | 0–1/none | 5– |
| 5 | 20/80 | " | 4–5 | 93/84 | 3/none | 5 |
| 6 | 0/100 | " | 4 | 94/84 | 3–4/none | 5 |
| 7 | 80/20 | hydroxyl functional polyester | 4–5 | 94/77 | 0–1/none | 3 |
| 8 | 60/40 | " | 6 | 94/73 | 2/none | 5 |
| 9 | 40/60 | " | 7 | 94/78 | 3/none | 5 |
| 10 | 20/80 | " | 9 | 94/79 | 3–4/light, fine | 5 |

TABLE 1-continued

| Clearcoat Example # | Weight Ratio Acrylic/Polyester | | Acid Etch[1] | 20° gloss/ DOI[2] | Humidity Resistance[3] Blush/Blisters | Recoat Adhesion[4] |
|---|---|---|---|---|---|---|
| 11 | 0/100 | " | 10 | 93/73 | 3–4/light, fine | 5 |
| 12 | 50/50 | polyester oligomer | 8 | 93/74 | 0/none | 5 |
| 13 | 50/50 | defunctionalized polyester | 6 | 94/75 | 0–1/none | 4+ |
| 14 | 50/50 | polyester made with all diol | 6 | 94/78 | 0–1/none | 5 |
| 15 | 50/50 | acid functional polyester | 7 | 93/69 | 0/none | 5 |
| 16 | 50/50 | polyester made with triol/diol mole ratio of 3.3/1. | 2 | 94/70 | 0–1/none | 0 |
| 17 | 50/50 | high molecular weight polyester | 4 | 94/71 | 1/none | 3 |
| 18 | 60/40 | partially alkylated aminoplast | — | — | — | 0 |
| 19 | 60/40 | " | — | — | — | 0 |
| 20 | 60/40 | " | — | — | — | 0 |
| 21 | 50/50 | poly(ester urethane) | — | — | — | 5 |

[1]A solution of 350 parts deionized water and 12 parts sulfurous acid was prepared. The acid solution was sprayed onto the panels using a polyethylene spray bottle, giving a distribution of drop sizes up to one quarter inch. Approximately 1.5 grams of solution was applied per 2 × 4 inch panel. The panels were then placed in an oven at 120° F. (49° C.) for twenty minutes. The panels were removed from the oven and the spray/bake procedure was repeated two more times give a total of 60 minutes at 120° F. (49° C) . After the third cycle the panels were washed with soap and water and dried, then rated for degree of acid etch resistance on a scale of 0–10 based on standard test panels (0 = no observable etch; 10 = severe etching).
[2]20° gloss measured by a D52 glossmeter from Hunter Lab. DOI (distinction of image) measured using a Dorigon II DOI meter from Hunter Lab.
[3]Five days exposure at 110° F. (43° C.) on a QCT condensation tester (Q-Panel Company; Cleveland, OH). Panels were then rated for blushing and blistering. Blush was rated on a scale of 0 to 5 (0 = no blush or color change, 5 = severe blush or color change).
[4]Recoat adhesion performed on panels containing two separately applied and baked layers of clearcoat as described in the panel preparation section. Adhesion tested using a model P-A-T paint adhesion test kit from Paul N. Gardner Company, Inc. equipped with a multiple tip cutter containing eleven teeth with 1.0 mm spacing. The panels were scribed according to ASTM-3359 and then Scotch Brand "898" tape from 3M Corporation was applied to the scribed area and then removed firmly in attempt to pull any loose paint from the panel. The adhesion was then rated according to ASTM-3359 (0 = no adhesion, 5 = perfect adhesion).

We claim:

1. An adherent film-forming composition comprising:
  (a) 20 to 80 percent by weight of an acrylic polymer containing a plurality of pendant groups of the structure:

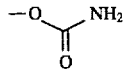

(b) 20 to 80 percent by weight of a polymer or oligomer containing repeating ester groups in the polymer or oligomer backbone; and
  (c) 25 to 50 percent by weight of a fully alkylated aminoplast crosslinking agent;
  the percentages by weight of (a) and (b) being based on total resin solids weight of (a) plus (b); the percentage by weight of (c) being based on total weight of resin solids in the film-forming composition.

2. The film-forming composition of claim 1 in which the percentage by weight of (a) plus (b) is from 25 to 75 percent by weight based on total weight of resin solids in the film-forming composition.

3. The film-forming composition of claim 1 in which the acrylic polymer is represented by randomly repeating units according to the following formula:

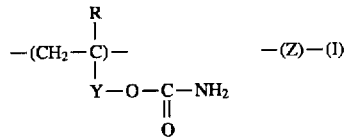

where R is H or CH$_3$; Y is a divalent linking group; Z is a repeating unit derived from one or more polymerizable ethylenically unsaturated monomers; and I is present in amounts of 30 to 70 percent by weight and Z is present in amounts of 30 to 70 percent by weight, with the percentage of I plus Z being equal to 100 percent.

4. The composition of claim 1 in which the acrylic polymer has a theoretical equivalent weight of 140 to 2500 based on equivalents of pendant groups.

5. The composition of claim 1 in which the acrylic polymer has a weight average molecular weight of from about 1000 to 30,000 as determined by gel permeation chromatography using polystyrene as a standard.

6. The composition of claim 1 in which the polymer or oligomer is selected from the group consisting of polyesters and poly(ester urethanes).

7. The composition of claim 6 in which the polymer or oligomer contains functional groups that are reactive with the functional groups of the crosslinking agent (c).

8. The composition of claim 7 in which the functional groups associated with the polymer or oligomer are selected from the group consisting of hydroxyl, carboxylic acid, and groups of the structure:

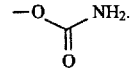

9. The composition of claim 7 in which the functional groups associated with the polymer or oligomer are selected from the group consisting of hydroxyl and

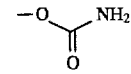

and mixtures of such groups.

10. The composition of claim 7 in which the functional groups associated with the polymer or oligomer are groups of the structure:

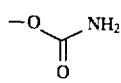

and in which the polymer or oligomer is present at levels of 40 to 80 percent by weight, the percentage based on the total resin solids weight of the polymer or oligomer and the acrylic polymer.

11. The composition of claim 7 in which the functional groups associated with the polymer or oligomer are hydroxyl groups, and in which the polymer or oligomer is present at levels of 20 to 60 percent by weight, the percentage based on the total resin solids weight of the polymer or oligomer and the acrylic polymer.

12. The composition of claim 6 in which the polymer or oligomer is a polyester which is the reaction product of an organic polycarboxylic acid or anhydride and a mixture of at least one diol and at least one triol.

13. The composition of claim 12 in which the polyester is prepared from a mixture of at least one diol and at least one triol and the mole ratio of triol to diol is less than 3.3:1.

14. The composition of claim 13 in which the diol is 2,2-dimethyl-3-hydroxypropyl-2,2-dimethyl-3hydroxypropionate and the triol is trimethylol propane.

15. The composition of claim 7 in which the polymer or oligomer has a calculated equivalent weight of up to 2500 based on equivalents of functional groups associated with the polymer or oligomer.

16. The composition of claim 7 in which the polymer or oligomer has a weight average molecular weight of from 1000 to 30,000, as determined by gel permeation chromatography using polystyrene as a standard.

17. The composition of claim 1 in which the aminoplast is a condensate of melamine with formaldehyde and an alcohol containing from 1 to 6 carbon atoms.

18. The composition of claim 17 in which the alcohol is selected from the group consisting of methanol, butanol and mixtures thereof.

19. The composition of claim 1 in which the hydroxyl value is less than 50 based on total weight of resin solids in the film-forming composition.

20. An adherent clear film-forming composition comprising:
(a) 20 to 60 percent by weight of an acrylic polymer containing a plurality of pendant groups of the structure:

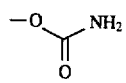

(b) 40 to 80 percent by weight of a polymer or an oligomer containing repeating ester groups in the polymer or oligomer backbone and having a plurality of pendant or terminal groups of the structure:

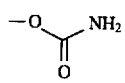

and (c) 25 to 50 percent by weight of a fully alkylated aminoplast crosslinking agent;
the percentages by weight of (a) and (b) being based on total resin solids weight of (a) plus (b); the percentage by weight of (c) being based on total weight of resin solids in the film-forming composition.

21. A method of applying a composite coating to a substrate comprising:
(a) applying to the substrate a colored film-forming composition to form a base coat and
(b) applying to said base coat a clear film-forming composition to form a transparent top coat over the base coat wherein the clear film-forming composition comprises:
(i) 20 to 80 percent by weight of an acrylic polymer containing a plurality of pendant groups of the structure:

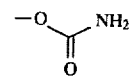

(ii) 20 to 80 percent by weight of a polymer or oligomer containing repeating ester groups in the polymer or oligomer backbone; and
(iii) 25 to 50 percent by weight of a fully alkylated aminoplast crosslinking agent having a plurality of functional groups that are reactive with said pendant groups of (i);
the percentages by weight of (i) and (ii) being based on total resin solids weight of (i) plus (ii); the percentage by weight of (iii) being based on total weight of resin solids in the film-forming composition.

22. A method of repairing a color plus clear composite coating comprising locating an area of the composite coating which is flawed, applying a clear film-forming composition to said flawed area after the flawed area has been prepared for recoating, wherein the clear film-forming composition comprises:
(i) 20 to 80 percent by weight of an acrylic polymer containing a plurality of pendant groups of the structure:

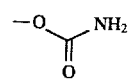

(ii) 20 to 80 percent by weight of a polymer or oligomer having a plurality of repeating ester groups in the polymer or oligomer backbone; and
(iii) 25 to 50 percent by weight of a fully alkylated aminoplast crosslinking agent;
the percentages by weight of (i) and (ii) being based on total resin solids weight of (i) plus (ii); the percentage by weight of (iii) being based on total weight of resin solids in the film-forming composition.

23. The method of claim 21 in which the acrylic polymer has a theoretical equivalent weight of from 140 to 2500 based on equivalents of pendant groups.

24. The method of claim 21 in which the acrylic polymer has a weight average molecular weight of from 1000 to 30,000 as determined by gel permeation chromatography using polystyrene as a standard.

25. The method of claim 21 in which the polymer or oligomer is selected from the group consisting of polyesters and poly(ester urethanes).

26. The method of claim 25 in which the polymer or oligomer contains functional groups that are reactive with the functional groups of the crosslinking agent (iii).

27. The method of claim 26 in which the functional groups associated with the polymer or oligomer are selected from the group consisting of hydroxyl and

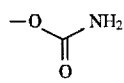

and mixtures of such groups.

28. The method of claim 25 in which the polymer or oligomer is a polyester which is the reaction product of an organic polycarboxylic acid or anhydride and a mixture of at least one diol and at least one triol.

29. The method of claim 28 in which the polyester is prepared from a mixture of at least one diol and at least one triol and the mole ratio of triol to diol is less than 3.3:1.

30. The method of claim 28 in which the diol is 2,2'-dimethyl-3-hydroxypropyl-2,2-dimethyl-3-hydroxypropionate and the triol is trimethylolpropane.

31. The method of claim 26 in which the polymer or oligomer has a theoretical equivalent weight of up to 2500 based on equivalents of functional groups.

32. The method of claim 25 in which the polymer or oligomer has a weight average molecular weight of from 1000 to 30,000 as measured by gel permeation chromatography using polystyrene as a standard.

33. The method of claim 21 in which the aminoplast is a condensate of melamine with formaldehyde and an alcohol containing from 1 to 6 carbon atoms.

34. The method of claim 33 in which the alcohol is selected from the group consisting of methanol, butanol and mixtures thereof.

35. The method of claim 22 in which the clear film-forming composition has a hydroxyl value less than 50 based on total weight of resin solids in the clear film-forming composition.

36. A method for applying a composite coating to a substrate that comprises:

(a) applying to the substrate a colored film-forming composition to form a base coat and (b) applying to said base coat a clear film-forming composition to form a transparent top coat over the base coat wherein the clear film-forming composition comprises:

(i) 20 to 60 percent by weight of an acrylic polymer containing a plurality of pendant groups of the structure:

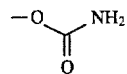

(ii) 40 to 80 percent by weight of a polymer or oligomer containing repeating ester groups in the polymer or oligomer backbone and having a plurality of pendant or terminal groups of the structure:

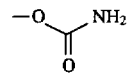

and (iii) 25 to 50 percent by weight of a fully alkylated aminoplast crosslinking agent;

the percentages by weight of (i) and (ii) being based on total resin solids weight of (i) plus (ii); the percentage by weight of (iii) being based on total weight of resin solids in the film-forming composition.

37. The coated article prepared by the method of claim 21.

38. The coated article prepared by the method of claim 22.

39. The coated article prepared by the method of claim 36.

* * * * *